US012445502B2

(12) United States Patent
Filart

(10) Patent No.: US 12,445,502 B2
(45) Date of Patent: Oct. 14, 2025

(54) IP MULTIMEDIA SUBSYSTEM (IMS) ORIGINATED BRANDED CALLING

(71) Applicant: T-Mobile USA, Inc., Bellevue, WA (US)

(72) Inventor: Homer Nicolas Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 187 days.

(21) Appl. No.: 18/184,925

(22) Filed: Mar. 16, 2023

(65) Prior Publication Data

US 2024/0275825 A1 Aug. 15, 2024

Related U.S. Application Data

(60) Provisional application No. 63/484,366, filed on Feb. 10, 2023.

(51) Int. Cl.
*H04L 65/1016* (2022.01)
*H04L 65/1069* (2022.01)

(52) U.S. Cl.
CPC ...... *H04L 65/1016* (2013.01); *H04L 65/1069* (2013.01)

(58) Field of Classification Search
CPC .......... H04L 65/1016; H04L 65/1069
USPC .......................................... 709/238
See application file for complete search history.

(56) References Cited

U.S. PATENT DOCUMENTS

| | | |
|---|---|---|
| 5,850,433 A | 12/1998 | Rondeau |
| 6,320,857 B1 | 11/2001 | Toennby et al. |
| 6,754,224 B1 | 6/2004 | Murphy |
| 6,909,776 B2 | 6/2005 | Holt et al. |
| 6,940,954 B1 | 9/2005 | Toebes |
| 7,412,446 B2 | 8/2008 | Shah |
| 7,451,921 B2 | 11/2008 | Dowling et al. |
| 7,574,487 B1 * | 8/2009 | Ravishankar ..... H04M 3/53383 379/265.09 |
| 7,792,546 B2 | 9/2010 | Toy et al. |
| 7,920,549 B2 | 4/2011 | Alt et al. |
| 8,185,154 B2 | 5/2012 | Toy et al. |
| 8,254,278 B2 | 8/2012 | Sterman et al. |
| 8,295,461 B1 | 10/2012 | Croak et al. |
| 8,305,983 B2 | 11/2012 | Siegel et al. |

(Continued)

FOREIGN PATENT DOCUMENTS

| | | |
|---|---|---|
| CN | 1221531 A | 6/1999 |
| CN | 1294812 A | 5/2001 |

(Continued)

*Primary Examiner* — Wing F Chan
*Assistant Examiner* — John Fan
(74) *Attorney, Agent, or Firm* — Perkins Coie LLP

(57) ABSTRACT

The disclosed technology relates to branding a voice call. A telecommunications system including a telephony application server (TAS) of an IP Multimedia Subsystem (IMS) can receive an indication of a voice call initiated at an originating endpoint device for a terminating endpoint device. The system detects that the originating endpoint device has a branding service subscription and identifies a profile for the subscription stored at a profile application server. The profile can include branding information for the originating endpoint device. The system can cause the terminating endpoint device to present the branding information upon receipt of the voice call.

20 Claims, 5 Drawing Sheets

(56) References Cited

U.S. PATENT DOCUMENTS

| | | |
|---|---|---|
| 8,386,640 B2 | 2/2013 | Siegel et al. |
| 8,428,578 B2 | 4/2013 | Silver |
| 8,582,475 B1 | 11/2013 | Marghescu et al. |
| 8,804,567 B2 | 8/2014 | Sterman et al. |
| 8,903,064 B2 | 12/2014 | Okita et al. |
| 8,934,474 B2 | 1/2015 | Croak et al. |
| 9,030,956 B2 | 5/2015 | Siegel et al. |
| 9,143,538 B2 | 9/2015 | Siegel et al. |
| 9,161,190 B2 | 10/2015 | Gentry |
| 9,247,071 B2 | 1/2016 | Dowling et al. |
| 9,596,274 B2 | 3/2017 | Lawson et al. |
| 9,686,326 B2 | 6/2017 | Siegel et al. |
| 9,769,646 B2 | 9/2017 | Mufti et al. |
| 9,787,827 B2 | 10/2017 | Miller |
| 9,866,701 B2 | 1/2018 | Sterman et al. |
| 10,798,134 B2* | 10/2020 | Sinha ............... H04L 65/1104 |
| 11,165,910 B2 | 11/2021 | Synal et al. |
| 11,329,840 B2* | 5/2022 | Ansari ................ H04L 63/20 |
| 2002/0176404 A1* | 11/2002 | Girard ............... H04M 7/1225 |
| | | 379/207.02 |
| 2007/0197227 A1 | 8/2007 | Naqvi et al. |
| 2008/0248790 A1 | 10/2008 | Ophir et al. |
| 2010/0232417 A1 | 9/2010 | Segre |
| 2011/0069702 A1* | 3/2011 | Oktay ............... H04L 65/1046 |
| | | 370/352 |
| 2012/0069840 A1 | 3/2012 | Zhu et al. |
| 2012/0129508 A1 | 5/2012 | Gentry |
| 2021/0250437 A1* | 8/2021 | Zhidov ............. H04M 3/42263 |
| 2022/0086276 A1* | 3/2022 | Ranalli ................. H04L 9/3247 |

FOREIGN PATENT DOCUMENTS

| | | |
|---|---|---|
| CN | 101340496 A | 1/2009 |
| CN | 101729555 A | 6/2010 |
| CN | 108307082 B | 5/2020 |
| CN | 107534666 B | 12/2020 |
| CN | 112087819 B | 5/2022 |
| EP | 1987681 A2 | 11/2008 |
| EP | 2434833 B1 | 8/2013 |
| EP | 1929805 B1 | 11/2017 |
| KR | 100462026 B1 | 12/2004 |
| KR | 20050088016 A | 9/2005 |
| KR | 100779846 B1 | 11/2007 |
| KR | 20070107546 A | 11/2007 |
| KR | 100825455 B1 | 4/2008 |
| KR | 101069530 B1 | 9/2011 |
| KR | 101223801 B1 | 1/2013 |
| KR | 101658310 B1 | 9/2016 |
| WO | 9747118 A1 | 12/1997 |
| WO | 02098119 A2 | 12/2002 |
| WO | 03055184 A1 | 7/2003 |
| WO | 2007100735 A2 | 9/2007 |
| WO | 2011041134 A1 | 4/2011 |
| WO | 2012093379 A1 | 7/2012 |
| WO | 2013185795 A1 | 12/2013 |
| WO | 2016138322 A1 | 9/2016 |
| WO | 2018068096 A1 | 4/2018 |

* cited by examiner

IP MULTIMEDIA SUBSYSTEM (IMS) ORIGINATED BRANDED CALLING

CROSS-REFERENCE TO RELATED APPLICATION(S)

This application claims the benefit of U.S. Provisional Application No. 63/484,366, filed on Feb. 10, 2023, entitled "IP Multimedia Subsystem (IMS) Originated Branded Calling," which is hereby incorporated by reference in its entirety.

BACKGROUND

In the modern era, the concept of branding has expanded to include marketing and communication techniques and tools that help to distinguish a company or products from competitors, aiming to create a lasting impression in the minds of customers. The key components that form a brand's toolbox include a brand's identity, personality, product design, brand communication (e.g., by logos and trademarks), brand awareness, brand loyalty, and various branding (e.g., brand management) strategies. Many companies believe that there is often little to differentiate between several types of products in the 21st century, hence branding is among a few remaining forms of product differentiation.

There are various means for communicating branding information. For example, telecommunications is the transmission of information by various types of technologies over wire, radio, optical, or other electromagnetic systems. It has its origin in the desire of humans for communication over a distance greater than that feasible with human voice, but with a similar scale of expediency. In particular, a cellular network or mobile network is a communication network where the link to and from end nodes is wireless. The network is distributed over land areas called "cells," each served by at least one fixed-location transceiver. These base stations provide the cell with the network coverage which can be used for transmission of voice, data, and other types of content that could be branded.

BRIEF DESCRIPTION OF THE DRAWINGS

Detailed descriptions of implementations of the present invention will be described and explained through the use of the accompanying drawings.

Figure 1:
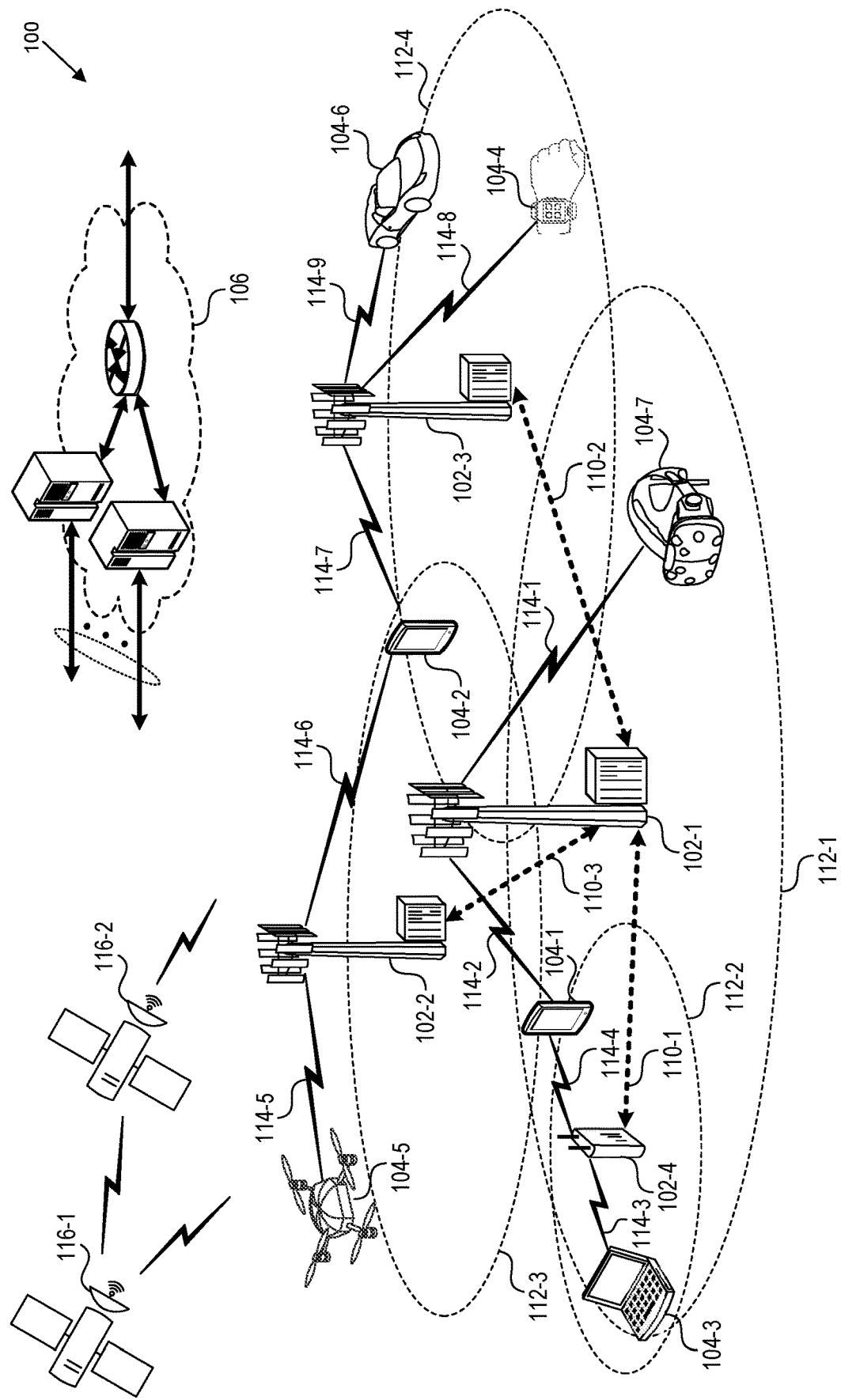
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to branding a voice call. A telecommunications system including a telephony application server (TAS) of an IP Multimedia Subsystem (IMS) can receive an indication of a voice call initiated at an originating endpoint device (e.g., handheld mobile wireless device) for a terminating endpoint device. The system detects that the originating endpoint device has a branding service subscription and identifies a particular profile for the subscription stored at a profile application server. The system can cause the terminating endpoint device to present branding information from the particular profile upon receipt of the voice call. In some embodiments, the system performs the check for the branding service subscription for every voice call. In some implementations, the branding information is cached to a Telephony Application Server (TAS) for a duration of time, or for a number of calls.

When the originating and terminating endpoint devices are subscribed to the same carrier network, the system can preauthorize the terminating endpoint device to present the particular branding information upon receipt of the voice call. On the other hand, when the originating and terminating endpoint devices are on different carrier networks, the terminating endpoint device is authorized by a certificate management platform of its own network carrier to present the branding information.

The disclosed technology addresses various problems. For example, enterprise voice calls are incorrectly marked as spam and blocked by customers' phones. Previous solutions to this problem are either insufficient or restricted to desktop phones. The STIR/SHAKEN framework adds more information to calls in order to validate them but STIR/SHAKEN still flags enterprise calls as spam. Solutions to this problem and others are provided by the disclosed IMS originated branded calling.

Studies show an uptick in the rate of acceptance of calls when they are branded. Branding a call not only includes altering the calling number to reflect a toll-free number rather than the native line number, but also changes the name of the caller to a preferred name (e.g., the company name or department), as well as adding a reason for the call (e.g., "Your order . . . "), a company logo, and making available or sending to a terminating device any other information relevant to the call e.g., geo-location. Branding IMS-originated calls also provides additional flexibility to enterprises in the number of network services they can use, as well as the ability to reach customers on their own mobile devices, both on and off the same network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
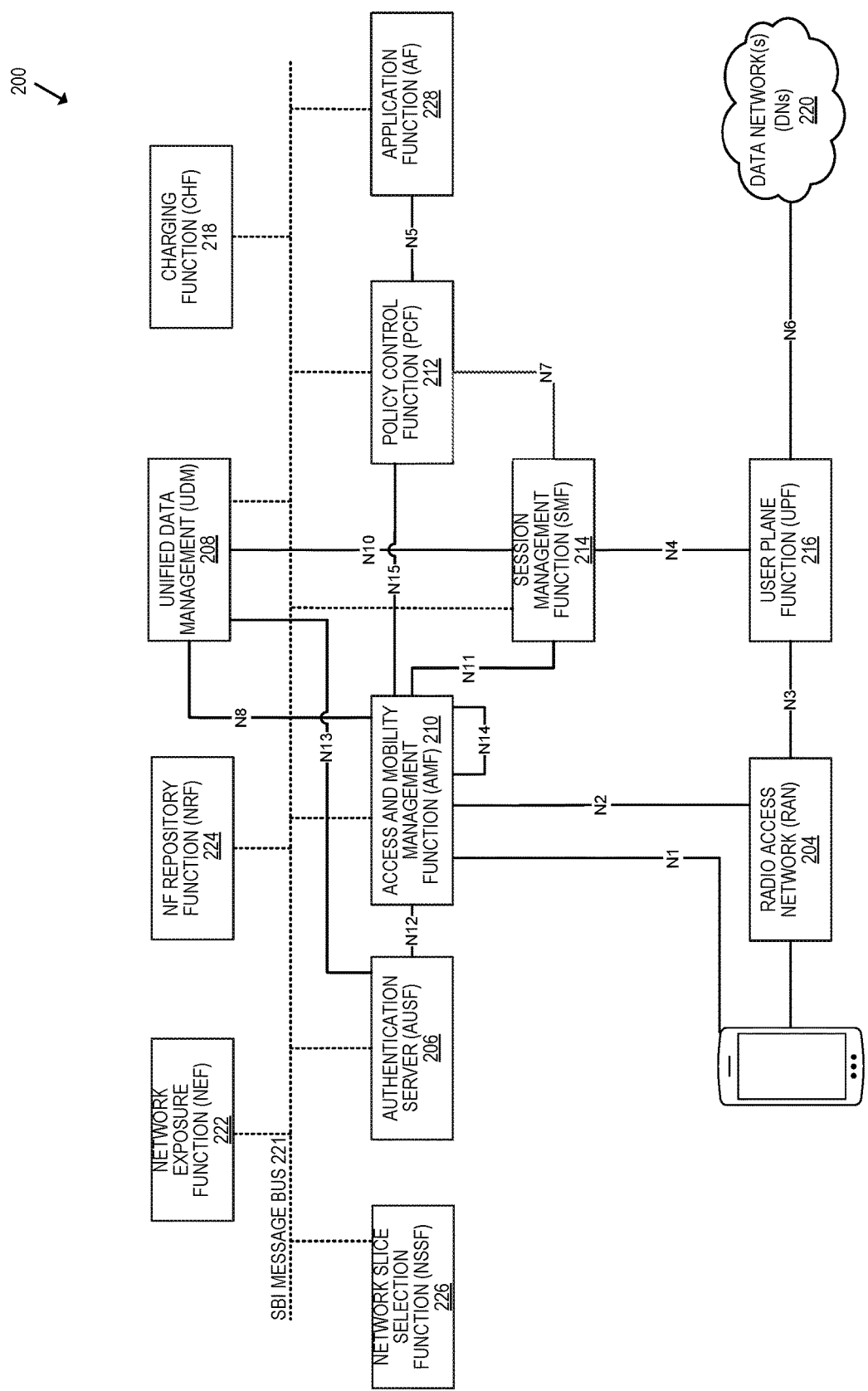
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Figure 3:
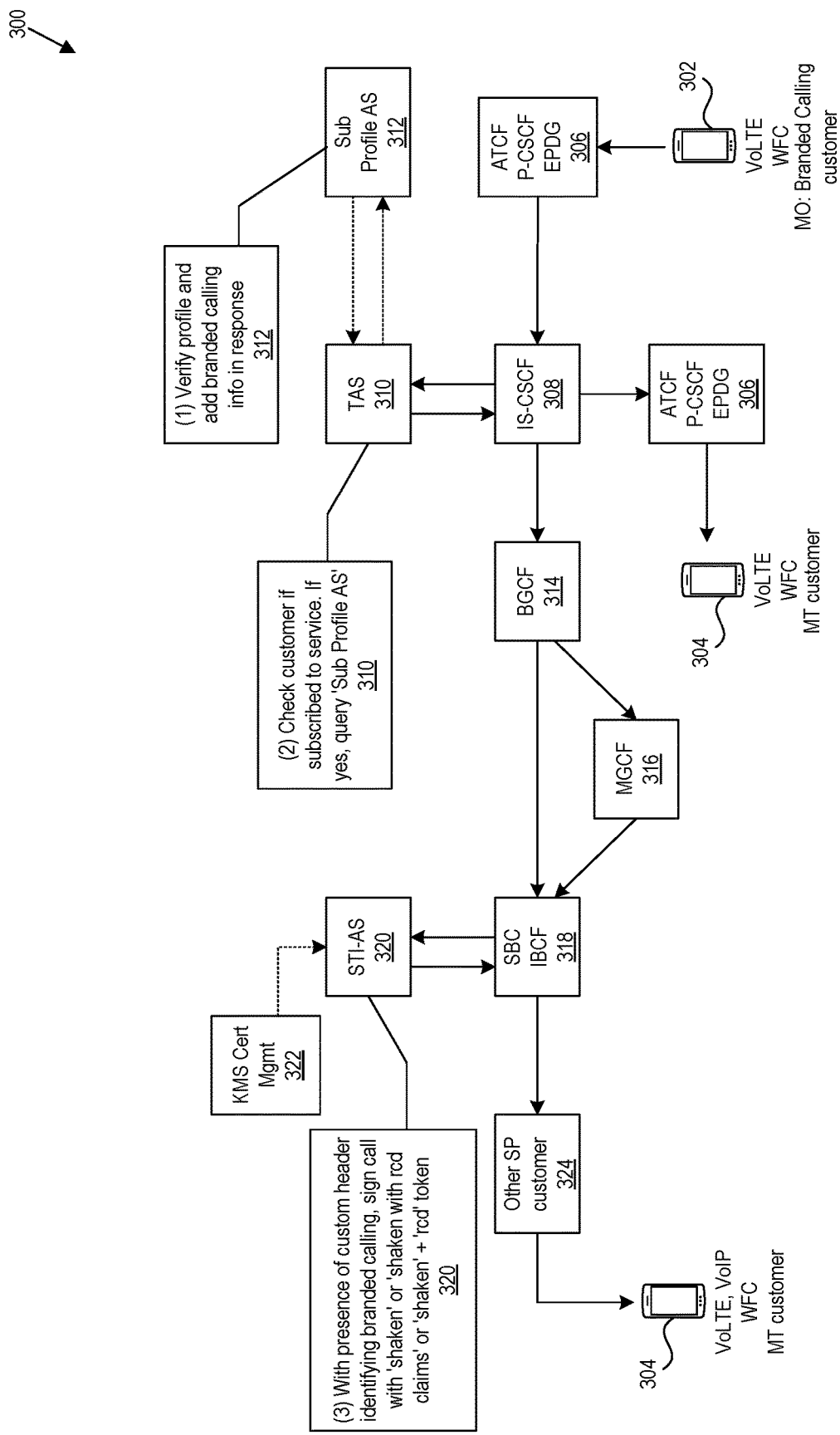
FIG. 3 is a block diagram that illustrates components of IP Multimedia Subsystem (IMS) configured for originated branded calling.

FIG. 3 is a block diagram that illustrates components of an IP Multimedia Subsystem (IMS) configured for originated branded voice calling. The IMS 300 is included within an in-network service provider. Included in the IMS 300 is an MO 302 (Mobile Originating Device). The MO 302 can be a branded calling customer. The MO 302 subscribes to the in-network service provider. The MO 302 can place a call to an MT 304 (Mobile Terminating Device). The MT 304 can be subscribed to the same in-network service provider, or to an outside SP 324 (service provider). The call can be an IMS-originated call. The call can be made using VoLTE (Voice Over LTE (4G)), WFC (Wi-Fi Calling), 5G, 6G, or any future wireless communications systems.

The call is then received at a Control Gateway 306. The Control Gateway can be an ATCF (Access Transfer Control Function), a P-CSCF (Proxy-Call Session Control Function, for LTE, 5G, or 6G calling) and/or an EPDG (Evolved Packet Data Gateway, for WFC). The Control Gateway 306 then routes the call to an I/S-CSCF 308 (Interrogating/Serving Call Session Control Function).

The I/S-CSCF 308 can route the call to a TAS 310 (Telephony Application Server). The TAS 310 can be an O-TAS 310 (Originating Telephony Application Server) or a T-TAS 310 (Terminating Telephony Application Server), configured to perform a check from an originating leg or a terminating leg for the call, respectively. The O-TAS 310 performs a check with a Sub Profile AS 312 (Application Service) to verify the MO 302 is subscribed to a Branding Service. In such an embodiment, the Sub Profile AS 312 can be an On-network Subscriber Profile Application Server. The Sub Profile AS 312 can include an API connection to the O-TAS 310, which is configured to provide profile and caller preferences for the MO 302 to the O-TAS 310. Alternatively, the connection between the O-TAS 310 and the Sub Profile AS 312 can be any protocol interface, such as GraphQL, HTTP REST, SIP, or Diameter.

Included among the profile and caller preferences can be the branding service. The branding service can include a network feature (e.g., call forwarding, call waiting, scam id, etc.) which the MO 302 pays for when they register with the in-network service provider, or at a later time.

In some embodiments, the O-TAS 310 only checks for the branding service when an MO 302 has paid for the branding service. In such embodiments, the network features the MO 302 pays for—including the branding service—have feature codes, which can be downloaded to various intermediate platforms, including an HSS (Home Subscriber Server) which belongs to the IMS 300, and from the HSS the codes can be downloaded to the O-TAS 310.

Alternatively or additionally, the O-TAS 310 can perform the check for the branding service for every call made by every MO 302. In such embodiments, the feature codes for the network features belonging to the MO 302—including the branding service—can be downloaded to the Sub Profile AS 312. The Sub Profile AS 312 can verify the profile and send a response to the O-TAS 310 with branding information. In some embodiments, a SIP header can identify the profile. In other embodiments, the connection can be governed by an HTTP REST protocol. In some implementations, the branding information is cached to the TAS 310 for a duration of time, or for a number of calls.

A branding information portal can be included in the branding service. If the MO 302 has subscribed to the branding service, a user of the MO 302 can use the branding information portal to enter the branding information that they want to appear on an interface of the MT 304, when the MT 304 receives a branded voice call from the MO 302. The branding information can include a variety of fields, including a preferred number, a preferred name, a reason for the call, a company logo, and additional information required to control which calls have branding information added to them.

The fields can replace, alter, or appear in addition to the fields that appear on a normal, unbranded call. The company logo can include the media directly, or indirectly via a URL (an https URL, an http URL, etc.), with the URL having an extension. The extension can belong to one of several media formats, including .bmp, .gif, .png, .mov, for example. The branding information can be downloaded from the branding information portal to the Sub Profile AS 312, where the Sub Profile AS 312 serves the branding information to the O-TAS 310. The MO 302 can choose to include only a subset of the preceding fields. The subset can be selected by a subscriber. For example, in some instances, the MO 302 may not wish to display a company logo to an MT 304 (e.g., when calling an employee versus a customer), or if they have paid for a specific service that does not include all of the fields (e.g., when the MO 302 has only paid for a preferred name). Alternatively, in certain implementations (e.g., in which the TAS is a T-TAS and the MT is on the same network as the MO, granting the T-TAS insight into the MT device) the subset can be dependent on features belonging to an originating endpoint device which has made a call, and/or a terminating endpoint device designated to receive the call. In such implementations, these features belonging to the devices can include registration, software version, etc.

Once the O-TAS 310 has received the branding information from the Sub Profile AS 312, it can modify the call to be a branded call. This modification can be to an outgoing SIP INVITE. The modification can be to a header, which the O-TAS 310 can change by adding any one or all of the fields enumerated above. The O-TAS 310 can then route the branded call to the I/S-CSCF 308.

The I/S-CSCF 308 can perform a look-up in the HSS. The look-up can check if the MT 304 subscribes to the in-network service provider, or if they subscribe to the Outside SP 324. In the former case, the MT 304 can be referred to as an "in-network" or "on-network" customer, and in the latter case the MT 304 can be an "off-network" customer.

If the MT 304 is an on-network customer, the branded call goes to the Control Gateway 306, which can be an ATCF, a P-CSCF, or an EPDG (depending on if the call was made using VoLTE, WFC, 5G, or 6G), and then finally to the MT customer 304. The branded call can be lightly encrypted or unencrypted and sent directly to the MT 304, given the location of the MT 304 and the MO 302 on the same network. However, if the MT 304 is an off-network customer, the I/S-CSCF 308 can perform a check to identify which Outside SP 324 the MT 304 belongs to (e.g., Verizon, AT&T, Comcast, Deutsche Telekom AG). After identifying the Outside SP 324, the branded call can go to a BGCF 314 (Breakout Gateway Control Function). From there, the branded call can go to an MGCF 316 (Media Gateway Control Function), or it can go directly to a Border Controller 318. The Border Controller 318 can be an SBC (Session Border Controller), an I-SBC (Interconnect Session Border Controller), or an IBCF (Interconnect Border Control Function). The Border Controller 318 provides SIP connectivity to the Outside SP 324.

Before going to the Outside SP 324, however, the branded call can get a redirection (e.g., a SIP redirect, initiated by sending a 302 message) to an STI-AS 320 (Secure Telephone Identity-Authentication Service). From there, the STI-AS 320 can check a KMS 322 (Key Management Service) based on the presence of the branding information included in the branded call. The STI-AS 320 can perform an authentication of the branded call from a STIR/SHAKEN perspective, with or without RCD claims (Rich Call Data). The RCD claims can include the branding information (e.g., a URL for a company logo, a reason for calling, a preferred calling name). This authentication can be accomplished by creating a passport for the branded call. The passport included in a SIP identity header includes the branding information, encoded in a different format for security (e.g., a JWT encoding).

In some implementations, the STI-AS 320 can query for branding information itself from an off-network Telephony Subscriber Profile Application Server. The branding information can be downloaded from the branding information portal to the off-network Telephony Subscriber Profile Application Server. The off-network Telephony Subscriber Profile Application Server can serve the branding information to the STI-AS 320 and the STI-AS 320 can change the call into the branded call by adding one or more of the fields enumerated in the description of the branding service. The branded call can be routed back through to the Outside SP 324 ("terminating service provider") where it is decrypted and validated. The branded call can be directed to the MT 304 by the Outside SP 324 by using VoLTE, WFC, 5G, or 6G.

In some implementations, the IMS 300 can receive branded calls from the Outside SP 324. In such implementations, the IMS 300 can verify the signature of a passport containing branding information sent through an Outside SP 324 from an off-network MO. This verification can include downloading a trusted root certificate from a trusted repository, as well as downloading all intermediate and end-entity certificates along the chain from their respective certificate repositories, and comparing a portion of the SIP header from the passport against the signature generated from the verified end-entity certificate to check that the branded call wasn't modified along the way (e.g., by a man in the middle attack). Once verified, the IMS 300 can send the branded call to an on-network MT 304.

Figure 4:
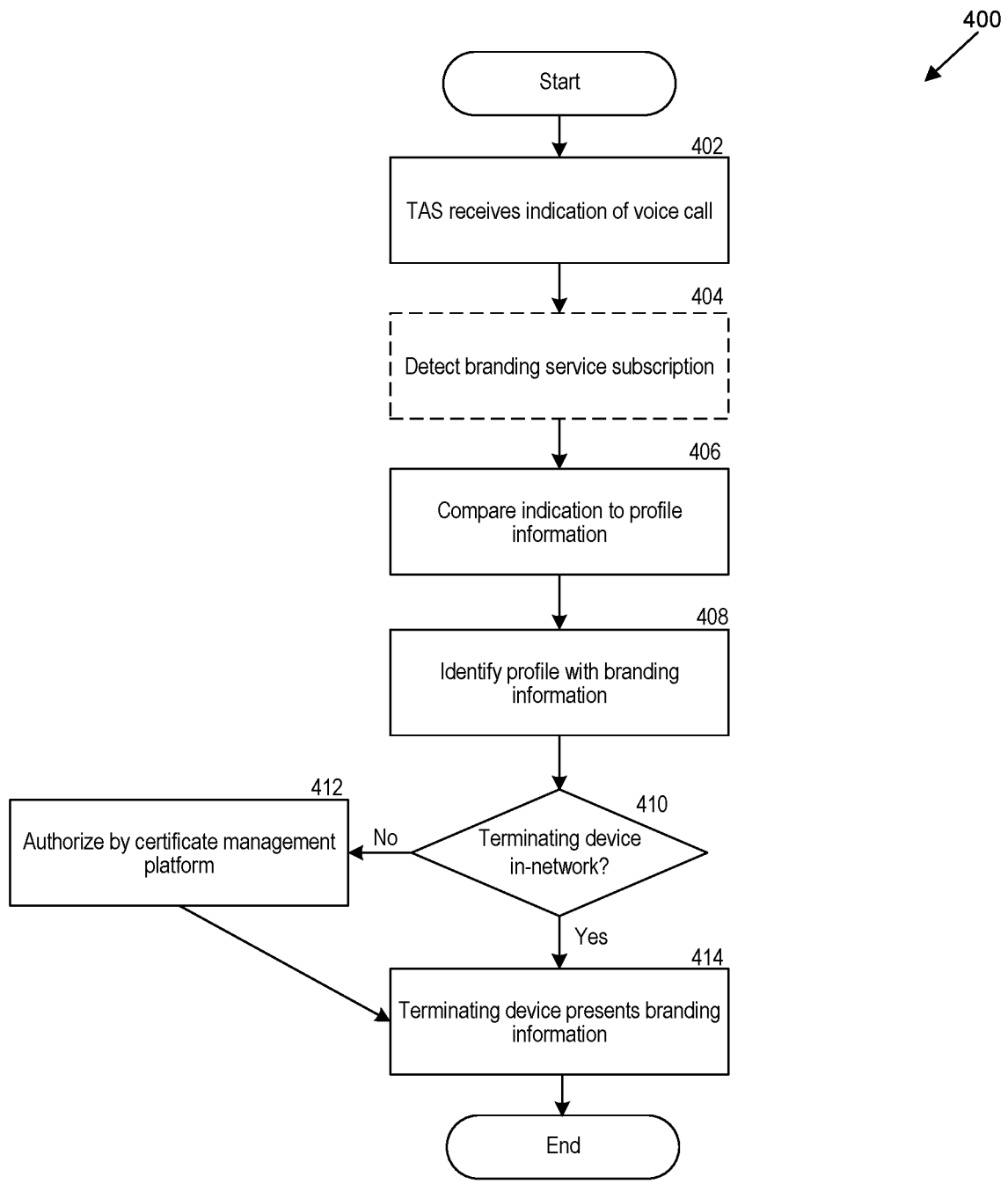
FIG. 4 is a flow diagram that illustrates a process for performing IMS originated branded calling.

FIG. 4 is a flow diagram that illustrates a process 400 for performing IMS originated branded calling. The process 400 can be performed by one or more telecommunications networks for branding a voice call.

At 402, a telecommunications system including a TAS of an IMS receives an indication of a voice call initiated at an originating endpoint device (e.g., smartphone, tablet computer, laptop, desktop) for a terminating endpoint device. The originating endpoint device is associated with a subscription to a first network carrier (e.g., in network).

At 404, the system detects that the originating endpoint device of the first network carrier has a subscription to a branding service. Alternatively, in some implementations, the system performs a check with the profile application server for every call originating or terminating within the first network carrier. The branding service is for adding branding information to voice calls initiated at the originating endpoint device. Examples of branding information include a preferred calling number, a preferred calling name, a displayed reason for calling, or an entity logo of the subscriber to the first carrier network. The preferred calling number can be different from a phone number registered in the IMS that belongs to the originating endpoint device.

In one example, the subscription includes network services, where each network service is associated with a network code, and the network codes are stored on the TAS. As such, detecting that the originating endpoint device of the first network has a branding service subscription occurs at the TAS. In one example, the network codes are stored on a profile application server. As such, detecting that the originating endpoint device of the first network has a branding service subscription includes sending a query to the profile application server from the TAS, where the query includes a request for the network code belonging to the branding service subscription. In other implementations, branding calling information is also stored internally within the TAS.

At 406, the system compares the indication of the originating endpoint device to profile information stored at the profile application server. The profile application server stores profiles for respective subscribers to the branding service for adding branding information to voice calls. Further, each of the profiles is associated with branding information configured to brand a voice call initiated by a respective subscriber.

In one example, the profile application server includes an off-network telephony subscriber profile application server. As such, the terminating endpoint device is caused to present the particular branding information by connecting to an outside service provider through a border controller node and redirecting to an outside authentication service, where the outside authentication service authenticates the indication of a voice call using STIR/SHAKEN protocols with RCD claims.

At 408, the system identifies, based on the subscription to the branding service, a particular profile for the subscription to the first network carrier, stored at the profile application server. The particular profile is associated with particular branding information.

In one example, the profile application server comprises an on-network subscriber profile application server, and identifying a particular profile for the subscription to the first network carrier further includes requesting the particular branding information from the on-network subscriber profile application server, where the request is sent from the TAS. Further, the particular branding information is added to the indication of a voice call, where adding the branding information occurs at the TAS after receiving the particular branding information from the on-network subscriber profile application server.

At 410, the system determines whether the terminating endpoint device is in network or off network. As such, the system causes the terminating endpoint device to present the particular branding information upon receipt of the voice call, whether in network or off network. When the terminating endpoint device is also subscribed to the network carrier (e.g., in network), the system may automatically preauthorize the terminating endpoint device to present the particular branding information upon receipt of the voice call at 414. When the terminating endpoint device is subscribed to another network carrier (e.g., off network), the system may require authorization by a certificate management platform of the other network carrier at 412, for example, before causing the terminating endpoint device to present the particular branding information at 414.

In one example, the profile application server comprises an off-network telephony subscriber profile application server and causes a terminating endpoint device to present the particular branding information upon receipt of an indication of the voice call. In one example, the process includes submitting a query to the off-network telephony subscriber profile application server from the authentication service. The query contains a request for branding information. The voice call is changed by adding the branding information received from the off-network telephony subscriber profile application server.

Computer System

Figure 5:
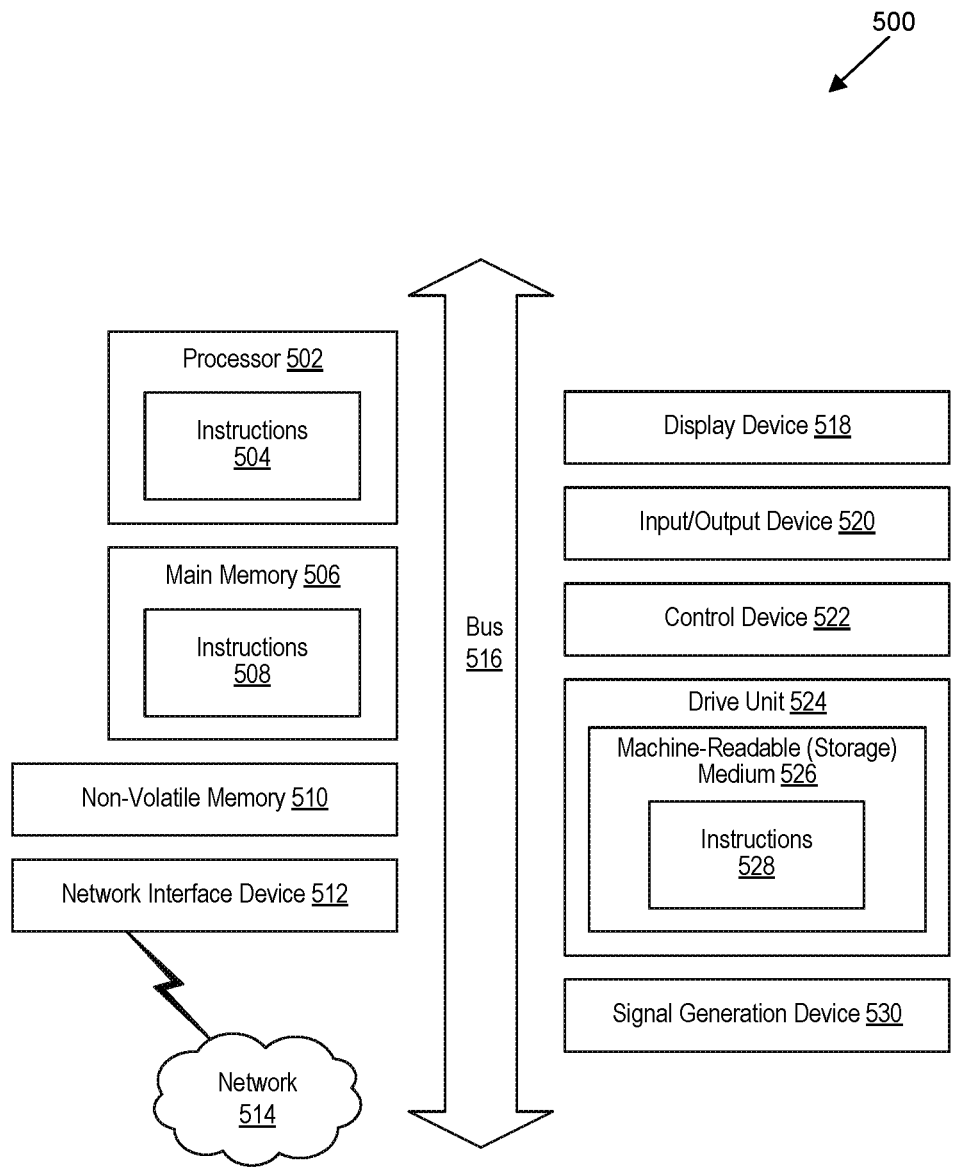
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A method performed by one or more telecommunications networks for branding a voice call, the method comprising:
   receiving, at a telephony application server (TAS) of an IP Multimedia Subsystem (IMS), an indication of a voice call initiated at an originating endpoint device for a terminating endpoint device, wherein the originating endpoint device is associated with a subscription to a first network carrier;
   detecting that the originating endpoint device of the first network carrier has a subscription to a branding service for adding branding information to voice calls initiated at the originating endpoint device;
   comparing the indication of the originating endpoint device to profile information stored at a profile application server,
      wherein the profile application server stores profiles for respective subscribers to the branding service for adding branding information to voice calls, and
      wherein each of the profiles is associated with branding information configured to brand a voice call initiated by a respective subscriber;
   identifying, based on the subscription to the branding service, a particular profile for the subscription to the first network carrier stored at the profile application server, wherein the particular profile is associated with particular branding information; and
   causing, by the first network carrier, the terminating endpoint device to present the particular branding information upon receipt of the voice call.

2. The method of claim 1 further comprising, prior to the terminating endpoint device being caused to present the particular branding information:
   detecting that the terminating endpoint device is subscribed to the first network carrier; and
   allowing the terminating endpoint device to present the particular branding information upon receipt of the voice call.

3. The method of claim 2, wherein the voice call is a first voice call and the terminating endpoint device is a first terminating endpoint device, the method further comprising:

receiving, at the TAS, an indication of a second voice call initiated at an originating endpoint device for a second terminating endpoint device,
    wherein the second endpoint device is associated with a subscription to a second network carrier different from the first network carrier; and
causing, by the second network carrier, the second terminating endpoint device to present the particular branding information upon receipt of an indication of the voice call,
    wherein causing the terminating endpoint device to present the particular branding information requires authorization by a certificate management platform of the second network carrier.

4. The method of claim 3, wherein causing the second terminating endpoint device to present the particular branding information upon receipt of an indication of the voice call further comprises:
    submitting a query to an off-network telephony subscriber profile application server, wherein the query contains a request for branding information; and
    adding the branding information received from the off-network telephony subscriber profile application server to the second voice call.

5. The method of claim 3, wherein causing the second terminating endpoint device to present the particular branding information further comprises:
    connecting to an outside service provider through a border controller node; and
    redirecting to an outside authentication service,
        wherein the outside authentication service authenticates the indication of a voice call by using STIR/SHAKEN protocols with Rich Call Data (RCD).

6. The method of claim 1, wherein the branding information comprises:
    a preferred calling number,
    a preferred calling name,
    a displayed reason for calling, and/or
    an entity logo of the subscriber to the first network carrier.

7. The method of claim 1:
    wherein the subscription includes network services that is each associated with a network code,
    wherein network codes are stored at the TAS, and
    wherein detecting that the originating endpoint device of the first network carrier has a branding service subscription occurs at the TAS.

8. The method of claim 1:
    wherein the subscription includes network services that is each associated with a network code stored on the profile application server, and
    wherein detecting that the originating endpoint device of the first network carrier has a branding service subscription further comprises:
        sending a query to the profile application server from the TAS,
            wherein the query includes a request for a network code of the subscription to the branding service.

9. The method of claim 2:
    wherein the profile application server includes an on-network subscriber profile application server, and
    wherein identifying a particular profile for the subscription to the first network carrier further comprises:
        requesting the particular branding information from the on-network subscriber profile application server, wherein the request is sent from the TAS; and
        adding the particular branding information to the indication of a voice call,
        wherein adding the branding information occurs at the TAS after receiving the particular branding information from the on-network subscriber profile application server.

10. At least one non-transitory computer-readable storage medium storing instructions, which, when executed by at least one data processor of a system, cause the system to:
    receive an indication of a voice call initiated at an originating endpoint device for a terminating endpoint device,
        wherein the originating endpoint device is associated with a subscription to a first network carrier;
    detect that the originating endpoint device of the first network carrier has a subscription to a branding service for adding branding information to voice calls initiated at the originating endpoint device;
    compare the indication of the originating endpoint device to profile information stored at a profile application server,
        wherein the profile application server stores profiles for respective subscribers to the branding service for adding branding information to voice calls, and
        wherein each of the profiles is associated with branding information configured to brand a voice call initiated by a respective subscriber;
    identify, based on the subscription to the branding service, a profile stored at the profile application server,
        wherein the profile is associated with branding information; and
    cause, by the first network carrier, the terminating endpoint device to present the branding information upon receipt of the voice call.

11. The at least one non-transitory computer-readable storage medium of claim 10, wherein the system is caused to, prior to the terminating endpoint device being caused to present the branding information:
    detect that the terminating endpoint device is subscribed to the first network carrier; and
    cause the terminating endpoint device to present the branding information upon receipt of the voice call.

12. The at least one non-transitory computer-readable storage medium of claim 10, wherein the voice call is a first voice call and the terminating endpoint device is a first terminating endpoint device, the system being further caused to:
    receive an indication of a second voice call initiated at an originating endpoint device for a second terminating endpoint device,
        wherein the second endpoint device is associated with a subscription to a second network carrier different from the first network carrier;
    cause, by the second network carrier, the second terminating endpoint device to present the branding information upon receipt of an indication of the voice call,
        wherein causing the terminating endpoint device to present the branding information requires authorization by the second network carrier.

13. The at least one non-transitory computer-readable storage medium of claim 12, wherein causing the second terminating endpoint device to present the branding information upon receipt of an indication of the voice call further comprises causing the system to:
    submit a query to an off-network telephony subscriber profile application server, wherein the query contains a request for branding information; and add the branding information received from the off-network telephony subscriber profile application server to the second voice call.

14. The at least one non-transitory computer-readable storage medium of claim 12, wherein causing the second terminating endpoint device to present the branding information further comprises causing the system to:
   connect to an outside service provider through a border controller node; and
   redirect to an outside authentication service,
      wherein the outside authentication service authenticates the indication of a voice call.

15. A system comprising:
   at least one hardware processor; and
   at least one non-transitory memory storing instructions, which, when executed by the at least one hardware processor, cause the system to:
      receive an indication of a voice call initiated at an originating endpoint device for a terminating endpoint device;
      detect that the originating endpoint device is subscribed to a branding service;
      compare the indication of the voice call initiated at the originating endpoint device to profile information stored at a profile application server;
      identify a profile for a subscription to the branding service stored at the profile application server,
         wherein the profile is associated with branding information; and
      cause, by a network carrier, the terminating endpoint device to present the branding information upon receipt of the voice call.

16. The system of claim 15, wherein the branding information comprises:
   a preferred calling number,
   a preferred calling name,
   a displayed reason for calling, and/or
   an entity logo for the originating endpoint device.

17. The system of claim 15:
   wherein the subscription is associated with a network code, and
   wherein detecting that the originating endpoint device is subscribed to the branding service occurs at a network node that stores the network code.

18. The system of claim 15:
   wherein the subscription is associated with a network code stored on the profile application server, and
   wherein detecting that the originating endpoint device is subscribed to the branding service further comprises causing the system to:
      send a query to the profile application server,
         wherein the query includes a request for a network code that identifies the branding service subscription of the originating endpoint device.

19. The system of claim 15, wherein identifying the profile for the subscription further comprises causing the system to:
   request the branding information from an on-network subscriber profile application server; and
   add the branding information to the voice call after receiving the branding information from the on-network subscriber profile application server.

20. The system of claim 15 further caused to, prior to the terminating endpoint device being caused to present the branding information:
   detect that the terminating endpoint device is on-network; and
   automatically causing the terminating endpoint device to present the branding information upon receipt of the voice call.

* * * * *